United States Patent
Chen et al.

(10) Patent No.: US 10,970,081 B2
(45) Date of Patent: Apr. 6, 2021

(54) STREAM PROCESSOR WITH DECOUPLED CROSSBAR FOR CROSS LANE OPERATIONS

(71) Applicant: Advanced Micro Devices, Inc., Sunnyvale, CA (US)

(72) Inventors: Jiasheng Chen, Orlando, FL (US); Bin He, Oviedo, FL (US); Mohammad Reza Hakami, Oviedo, FL (US); Timothy Lottes, Orlando, FL (US); Justin David Smith, Mission Viejo, CA (US); Michael J. Mantor, Orlando, FL (US); Derek Carson, San Jose, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 15/637,629

(22) Filed: Jun. 29, 2017

(65) Prior Publication Data

US 2019/0004814 A1  Jan. 3, 2019

(51) Int. Cl.
*G06F 9/30* (2018.01)
*G06F 9/38* (2018.01)
*G06F 9/52* (2006.01)

(52) U.S. Cl.
CPC ........ *G06F 9/3887* (2013.01); *G06F 9/30003* (2013.01); *G06F 9/30032* (2013.01);
(Continued)

(58) Field of Classification Search
None
See application file for complete search history.

(56) References Cited

U.S. PATENT DOCUMENTS

| | | |
|---|---|---|
| 5,553,223 A | 9/1996 | Greenlee et al. |
| 5,706,502 A | 1/1998 | Foley et al. |

(Continued)

FOREIGN PATENT DOCUMENTS

| | | |
|---|---|---|
| KR | 100255510 B1 | 5/2000 |
| WO | 96/38791 A1 | 12/1996 |
| WO | 2007072435 A2 | 6/2007 |

OTHER PUBLICATIONS

Smith et al., U.S. Appl. No. 15/728,191, entitled "Method and Apparatus for In-Band Priority Adjustment Forwarding in a Communication Fabric", filed Oct. 9, 2017, 29 pages.

(Continued)

*Primary Examiner* — Jacob Petranek
(74) *Attorney, Agent, or Firm* — Kowert Hood Munyon Rankin and Goetzel PC; Rory D. Rankin

(57) ABSTRACT

Systems, apparatuses, and methods for implementing a decoupled crossbar for a stream processor are disclosed. In one embodiment, a system includes at least a multi-lane execution pipeline, a vector register file, and a crossbar. The system is configured to determine if a given instruction in an instruction stream requires a permutation on data operands retrieved from the vector register file. The system conveys the data operands to the multi-lane execution pipeline on a first path which includes the crossbar responsive to determining the given instruction requires a permutation on the data operands. The crossbar then performs the necessary permutation to route the data operands to the proper processing lanes. Otherwise, the system conveys the data operands to the multi-lane execution pipeline on a second path which bypasses the crossbar responsive to determining the given instruction does not require a permutation on the input operands.

20 Claims, 8 Drawing Sheets

(52) U.S. Cl.
CPC ........ *G06F 9/30036* (2013.01); *G06F 9/3802* (2013.01); *G06F 9/3836* (2013.01); *G06F 9/3851* (2013.01); *G06F 9/3893* (2013.01); *G06F 9/52* (2013.01)

(56) References Cited

U.S. PATENT DOCUMENTS

| | | | |
|---|---|---|---|
| 5,761,513 | A | 6/1998 | Yellin et al. |
| 5,815,653 | A | 9/1998 | You et al. |
| 5,923,885 | A | 7/1999 | Johnson et al. |
| 6,058,393 | A | 5/2000 | Meier et al. |
| 6,119,247 | A | 9/2000 | House et al. |
| 6,128,704 | A | 10/2000 | Jun |
| 6,138,140 | A | 10/2000 | Yokote |
| 6,185,703 | B1 | 2/2001 | Guddat et al. |
| 6,522,189 | B1 | 2/2003 | Do et al. |
| 6,618,854 | B1 | 9/2003 | Mann |
| 6,895,482 | B1 | 5/2005 | Blackmon et al. |
| 7,154,300 | B2 | 12/2006 | Anders et al. |
| 7,369,449 | B2 | 5/2008 | Tsunetou |
| 7,694,077 | B2 | 4/2010 | Hironaka et al. |
| 7,873,812 | B1* | 1/2011 | Mimar ................... G06T 1/20 712/22 |
| 8,359,421 | B2 | 1/2013 | Wang et al. |
| 8,914,613 | B2* | 12/2014 | Sperber ............ G06F 9/30032 712/22 |
| 9,430,411 | B2 | 8/2016 | Lin et al. |
| 9,933,841 | B2 | 4/2018 | Sideris et al. |
| 9,971,700 | B2 | 5/2018 | Loh |
| 9,983,652 | B2 | 5/2018 | Piga et al. |
| 10,108,249 | B2 | 10/2018 | Seki et al. |
| 2003/0062944 | A1 | 4/2003 | Do et al. |
| 2004/0054877 | A1* | 3/2004 | Macy, Jr. ................. G06F 7/76 712/221 |
| 2004/0088489 | A1 | 5/2004 | Hironaka et al. |
| 2004/0225840 | A1 | 11/2004 | O'Connor et al. |
| 2005/0146357 | A1 | 7/2005 | Anders et al. |
| 2006/0018179 | A1 | 1/2006 | Marchal et al. |
| 2007/0140021 | A1 | 6/2007 | Tsunetou et al. |
| 2007/0250683 | A1* | 10/2007 | Van Hook ........... G06F 9/30032 712/22 |
| 2008/0126750 | A1 | 5/2008 | Sistla |
| 2008/0222360 | A1 | 9/2008 | Hironaka et al. |
| 2008/0313482 | A1 | 12/2008 | Karlapalem et al. |
| 2011/0035529 | A1 | 2/2011 | Wang et al. |
| 2011/0119526 | A1 | 5/2011 | Blumrich et al. |
| 2011/0219208 | A1 | 9/2011 | Asaad et al. |
| 2014/0189311 | A1* | 7/2014 | Roussel ............. G06F 9/30032 712/210 |
| 2014/0192583 | A1 | 7/2014 | Rajan et al. |
| 2014/0298056 | A1 | 10/2014 | Seki et al. |
| 2015/0012724 | A1* | 1/2015 | Lutz .................... G06F 9/3887 712/22 |
| 2015/0120978 | A1 | 4/2015 | Kalyanasundharam et al. |
| 2015/0301827 | A1 | 10/2015 | Sideris et al. |
| 2018/0285315 | A1 | 10/2018 | Ray et al. |

OTHER PUBLICATIONS

Tsien et al., U.S. Appl. No. 15/725,912, entitled "Dynamic Control of Multi-Region Fabric", filed Oct. 5, 2017, 29 pages.

Cheng, Xianwen, U.S. Appl. No. 16/208,010, entitled "Crossbar Between Clients and a Cache", filed Dec. 3, 2018, 27 pages.

Non-Final Office Action in U.S. Appl. No. 16/208,010, dated Jul. 18, 2019, 12 pages.

Ofori-Attah et al., "Architectural Techniques for Improving the Power Consumption of NoC-Based CMPs: A Case Study of Cache and Network Layer", Journal of Low Power Electronics and Applications, 2017, 24 pages.

Nagarajan, Arthi, "Data-Transformation Algorithms for Minimizing Bit Flips on GPU Data Buses", Thesis, Aug. 2017, 47 pages.

Kalla et al., "Distance-Based Recent Use (DRU): An Enhancement to Instruction Cache Replacement Policies for Transition Energy Reduction", IEEE Transactions on Very Large Scale Integration (VLSI) Systems, Jan. 2006, pp. 59-80, vol. 14, No. 1.

Ge, Zhiguo, "A DVS-based Pipelined Reconfigurable Instruction Memory", Proceedings of the 46th Annual Design Automation Conference, Jul. 26, 2009, pp. 897-902.

Aboughazaleh et al., "Near-memory Caching for Improved Energy Consumption", Proceedings of the 2005 International Conference on Computer Design, Oct. 2, 2005, pp. 105-110.

Notice of Allowance in U.S. Appl. No. 16/208,010, dated Dec. 13, 2019, 9 pages.

* cited by examiner

STREAM PROCESSOR WITH DECOUPLED CROSSBAR FOR CROSS LANE OPERATIONS

BACKGROUND

Description of the Related Art

Many different types of computing systems include parallel processors (e.g., vector processors, single-instruction, multiple-data (SIMD) processors) with a plurality of processing lanes for performing data processing operations in parallel upon respective operands. It is noted that parallel processors can also be referred to herein as "stream processors". Computing systems with multiple lanes of processing circuitry are able to achieve high levels of data throughput. When multimedia, graphics, or other applications are executing on a multi-lane SIMD processor, SIMD operations often require permutation operations to shift source data operands between lanes. The traditional way to achieve the permutation is to use a global crossbar in the front of the multi-lane pipeline to shift the operands. As used herein, the term "crossbar" is defined as a circuit with multiple lanes that allows data on any lane at an output of the circuit to come from data on any lane at the input of the circuit. The routing performed by the crossbar is dependent on control signals provided to the control logic of the crossbar. The drawback of using a global crossbar is that even if the instruction does not need permutation, the data would still flow through the crossbar and waste power and increase the execution latency.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF EMBODIMENTS

Figure 1:
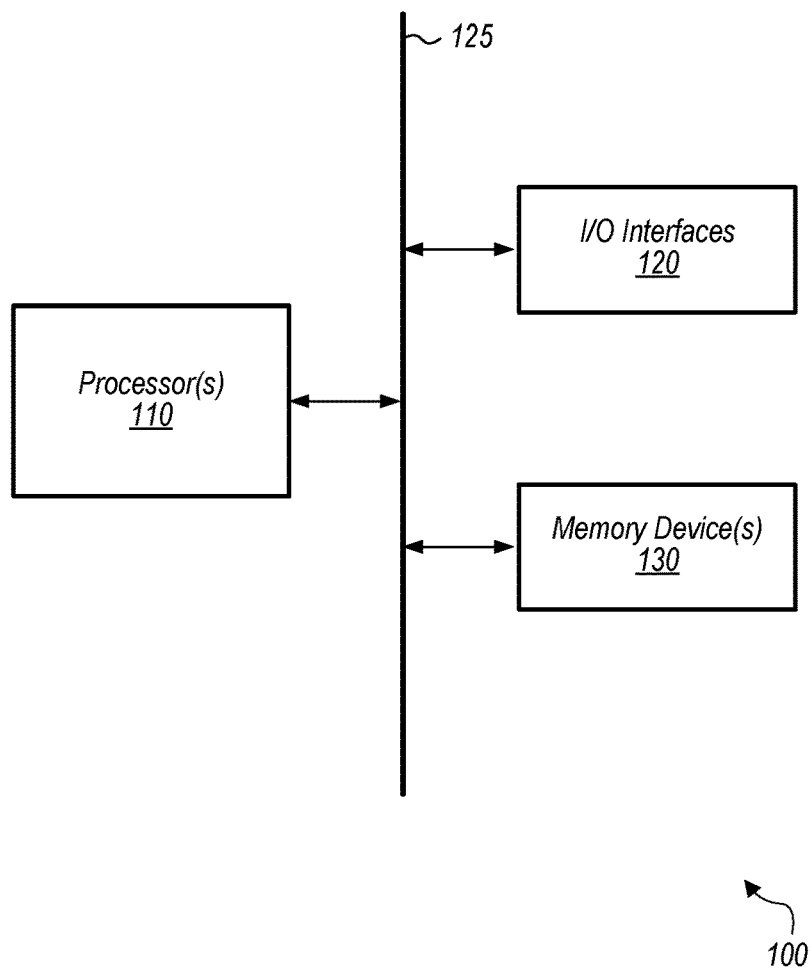
FIG. 1 is a block diagram of one embodiment of a computing system.

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Systems, apparatuses, and methods for implementing a decoupled crossbar in a stream processor are disclosed herein. In one embodiment, a system includes at least a multi-lane execution pipeline, a vector register file, and a crossbar. The system determines if a given instruction in an instruction stream requires a permutation on input operands retrieved from the vector register file. The system conveys the input operands to the multi-lane execution pipeline via the crossbar responsive to determining that the given instruction requires a permutation on the input operands. Otherwise, the system conveys the input operands to the multi-lane execution pipeline by bypassing the crossbar responsive to determining that the given instruction does not require a permutation on the input operands.

In one embodiment, a permutation is performed using multiple crossbars. For example, in this embodiment, a first layer of N×N crossbars performs a first permutation of operands across lanes of a multi-lane execution pipeline. The value of N can vary according to the embodiment. Next, a second layer of N×N crossbars performs a second permutation of operands across lanes of the multi-lane execution pipeline. Then, the operands are conveyed to the lanes of the multi-lane execution pipeline to execute a given instruction.

In one embodiment, an N×N cross-lane operand permutation is performed using a pair of N/2-by-N/2 crossbars. Initially, a first permutation is performed by permutating operands across a first set of N/2 lanes of a multi-lane execution pipeline using a first N/2-by-N/2 crossbar while simultaneously permutating operands across a second set of N/2 lanes using a second N/2-by-N/2 crossbar. Next, the results of the first permutation are written back to the vector register file. During the first permutation, the first crossbar rearranges operands between lanes of the first set of N/2 lanes while the second crossbar rearranges operands between lanes of the second set of N/2 lanes. It is noted that some of the lanes will be unused during the first permutation. Then, a second permutation is performed to arrange the operands in each set of lanes to be cross-written to the other set of lanes. Accordingly, during the second permutation, the first crossbar sorts operands in the first set of lanes to align the operands with their target lanes in the second set of lanes. At the same time, the second crossbar sorts operands in the second set of lanes to align the operands with their target lanes in first set of lanes. It is noted that some of the lanes will be unused during the second permutation. Then, the first crossbar writes the aligned operands across to the second set of lanes and the second crossbar writes the aligned operands across to the first set of lanes. Then, the results of the second permutation are merged with the results of the first permutation and the merged results are conveyed to the multi-lane execution pipeline to initiate execution of a given instruction.

Referring now to FIG. 1, a block diagram of one embodiment of a computing system 100 is shown. In one embodiment, computing system 100 includes at least processor(s) 110, input/output (I/O) interfaces 120, bus 125, and memory device(s) 130. In other embodiments, computing system 100 can include other components and/or computing system 100 can be arranged differently.

Processors(s) 110 are representative of any number and type of processing units (e.g., central processing unit (CPU), graphics processing unit (GPU), digital signal processor (DSP), field programmable gate array (FPGA), application specific integrated circuit (ASIC)). In one embodiment, processor(s) 110 includes a vector processor with a plurality of processing lanes. The vector processor can also be referred to as a stream processor. In one embodiment, the vector processor includes a decoupled crossbar which can be utilized to permutate data operands across lanes of the vector processor. The vector processor is configured to determine if a given instruction in an instruction stream requires a permutation on data operands retrieved from the vector register file. The vector processor conveys the data operands to the multi-lane execution pipeline on a first path which includes the crossbar responsive to determining the given instruction requires a permutation on the data operands. The crossbar then performs the necessary permutation to route the data operands to the proper processing lanes. Otherwise, the vector processor conveys the data operands to the multi-lane execution pipeline on a second path which bypasses the crossbar responsive to determining the given instruction does not require a permutation on the input operands.

In cases when permutation is not required for operands of a given instruction, the operands can bypass the crossbar and be conveyed directly to the processing circuitry of the vector processor. This helps to reduce latency and power consumption of the vector processor. As used herein, the term "lane" is defined as a data path of the vector processor. A "lane" includes processing circuitry (e.g., an execution pipeline) to process the input operand(s) as specified by a given instruction. For example, in one embodiment, the processing circuitry can be configured to perform a fused multiply-add (FMA) operation. In some cases, the processing operation performed by the processing circuitry is the same for each lane of the vector processor. It is noted that the terms "vector processor" and "multi-lane execution pipeline" are used interchangeably herein.

Memory device(s) 130 are representative of any number and type of memory devices. For example, the type of memory in memory device(s) 130 can include Dynamic Random Access Memory (DRAM), Static Random Access Memory (SRAM), NAND Flash memory, NOR flash memory, Ferroelectric Random Access Memory (FeRAM), or others. Memory device(s) 130 are accessible by processor(s) 110. I/O interfaces 120 are representative of any number and type of I/O interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices can be coupled to I/O interfaces 120. Such peripheral devices include (but are not limited to) displays, keyboards, mice, printers, scanners, joysticks or other types of game controllers, media recording devices, external storage devices, network interface cards, and so forth.

In various embodiments, computing system 100 can be a computer, laptop, mobile device, server or any of various other types of computing systems or devices. It is noted that the number of components of computing system 100 can vary from embodiment to embodiment. There can be more or fewer of each component than the number shown in FIG. 1. It is also noted that computing system 100 can include other components not shown in FIG. 1.

Figure 2:
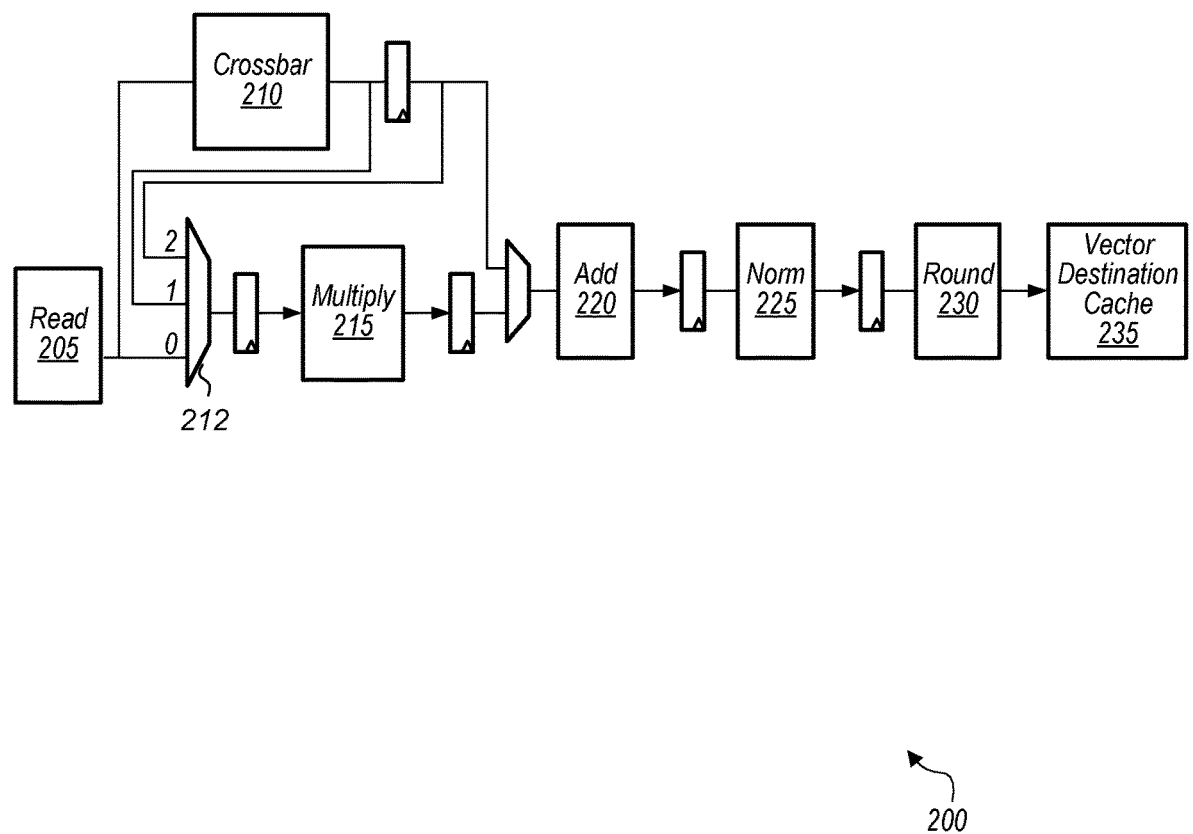
FIG. 2 is a block diagram of one embodiment of an execution pipeline with a decoupled crossbar.

Turning now to FIG. 2, a block diagram of one embodiment of an execution pipeline 200 with a decoupled crossbar 210 is shown. In one embodiment, one or more instances of execution pipeline 200 can be included within processor(s) 110 (of FIG. 1). In one embodiment, execution pipeline 200 includes a read stage 205, a decoupled crossbar 210, multiply stage 215, add stage 220, normalization stage 225, rounding stage 230, and vector destination cache 235. It is noted that the connections between each stage can include multiple lanes of data. For example, in one embodiment, execution pipeline 200 is a single-instruction, multiple-data (SIMD) processor. In other embodiments, execution pipeline 200 can include other stages and/or be structured in a different manner.

Read stage 205 involves reading operands from a vector register file (not shown). In one embodiment, a vector register file can include and/or be coupled to multiple structures for storing data. For example, in one embodiment, the vector register file is coupled to source operand buffers and vector destination cache 235. During read stage 205, the operands can be retrieved from the vector register file, source operand buffers, vector destination cache, and/or other structures. As used herein, when operands are described as being retrieved from the vector register file, this is intended to encompass retrieving operands from any of the above structures which are part of or coupled to the vector register file.

Data is conveyed via flops from read stage 205 to decoupled crossbar 210 and/or multiply unit 215. If the current instruction being processed does not require a cross-lane permutation of the operands, then data is conveyed from read stage 205 only to multiply stage 215 via the "0" input of multiplexer 212. In this case, the data bypasses crossbar 210. Otherwise, if the current instruction requires a cross-lane permutation of the operands, then data is routed to crossbar 210 from read stage 205.

In one embodiment, crossbar 210 is a multi-lane crossbar configured to permutate operands from input lanes to the appropriate output lanes. In one embodiment, crossbar 210 is configured to support an arbitrary permutation of operands from any input lane to any output lane. In one embodiment, crossbar 210 is constructed from multiple smaller crossbars. For example, in one embodiment, if execution pipeline 200 is a 16-lane execution pipeline, then crossbar 210 can be constructed from four 8×8 lane crossbars. In other embodiments, crossbar 210 can include other numbers of lanes and/or be constructed from other configurations of smaller crossbars.

Depending on the current instruction, the output of crossbar 210 can be conveyed to multiply stage 215 or to add stage 220. For example, if the instruction does not require a multiply operation on the operands, then the output of crossbar 210 is coupled to add stage 220. If the instruction requires a multiply operation on the operands, then the output of crossbar 210 is coupled to multiply stage 215 via multiplexer 212. In one embodiment, crossbar 210 is utilized as a local N/2-by-N/2 crossbar without one stage. In this embodiment, the output of crossbar 210 is conveyed to the "1" input of multiplexer 212. In another embodiment, crossbar 210 is utilized as a full N-by-N crossbar with one more stage. In this embodiment, the output of crossbar 210 is conveyed to the "2" input of multiplexer 212.

The output of multiply stage 215 is coupled via flops to add stage 220, the output of add stage 220 is coupled via flops to normalization stage 225, the output of normalization stage 225 is coupled via flops to rounding stage 230, and then the output of rounding stage 230 is written to vector destination cache 235.

Figure 3:
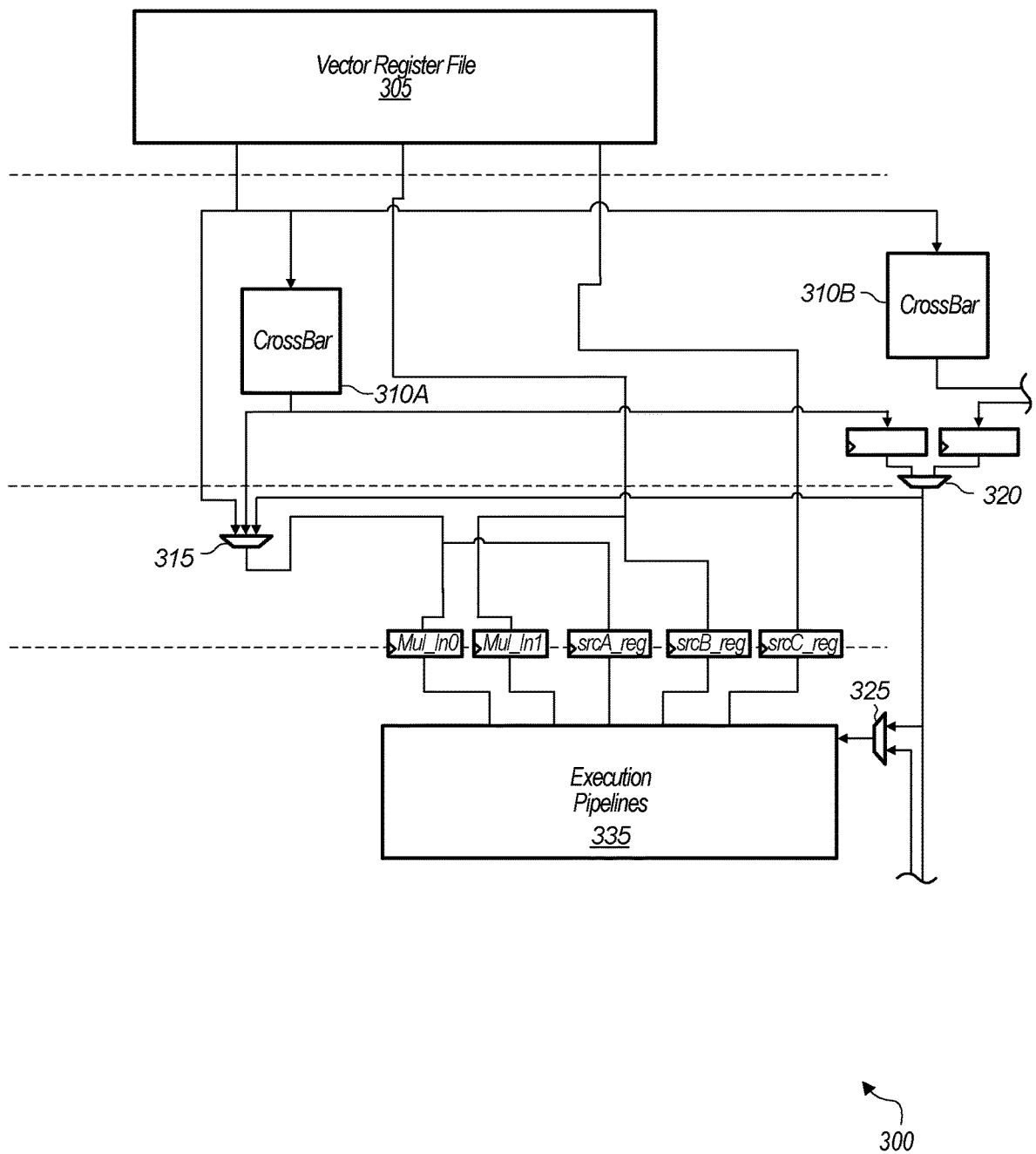
FIG. 3 is a block diagram of one embodiment of a portion of a vector processor.

Referring now to FIG. 3, one embodiment of a block diagram of a portion of a vector processor 300 is shown. In one embodiment, the portion of vector processor 300 shown in FIG. 3 is one quadrant of a vector processor. The other quadrants include similar circuitry for implementing a decoupled crossbar as part of the vector processor. In one embodiment, vector processor 300 is included within processors 110 of system 100 (of FIG. 1).

Vector processor 300 includes vector register file 305, which can also include or be coupled to source operand buffers and a vector destination cache. In one embodiment, vector register file 305 is implemented with multiple banks of random-access memory (RAM). The data operands are retrieved from vector register file 305 and coupled to crossbars 310A-B, multiplexer 315, and registers on the inputs of execution pipelines 335. In one embodiment, crossbars 310A-B are 8×8 crossbars with eight input lanes and eight output lanes. Each crossbar 310A-B is configured to route any input lane to any output lane, depending on the type of permutation which is specified for a given instruction being executed. If the given instruction being executed does not specify that a permutation should be performed, then the operands are routed to execution pipelines 335 by bypassing crossbars 310A-B. This allows the given instruction to be executed in one fewer clock cycle by avoiding the delay of passing through the crossbars 310A-B. Also, power consumption is reduced by bypassing crossbars 310A-B. In one embodiment, execution pipelines 335 are vector arithmetic logic unit (VALU) execution pipelines. In other embodiments, execution pipelines 335 can be other types of pipelines.

In one embodiment, the output of crossbar 310A is coupled to multiplexer 320 which is connected to the execution pipelines in the adjacent quadrant of the vector processor. Similarly, the output of a crossbar in an adjacent quadrant is coupled to the other input of multiplexer 320. Also, the output of a crossbar in another adjacent quadrant is coupled to an input of multiplexer 325 to feed execution pipelines 335. In this way, a permutation can be performed across the different quadrants of the entire vector processor.

Figure 4:
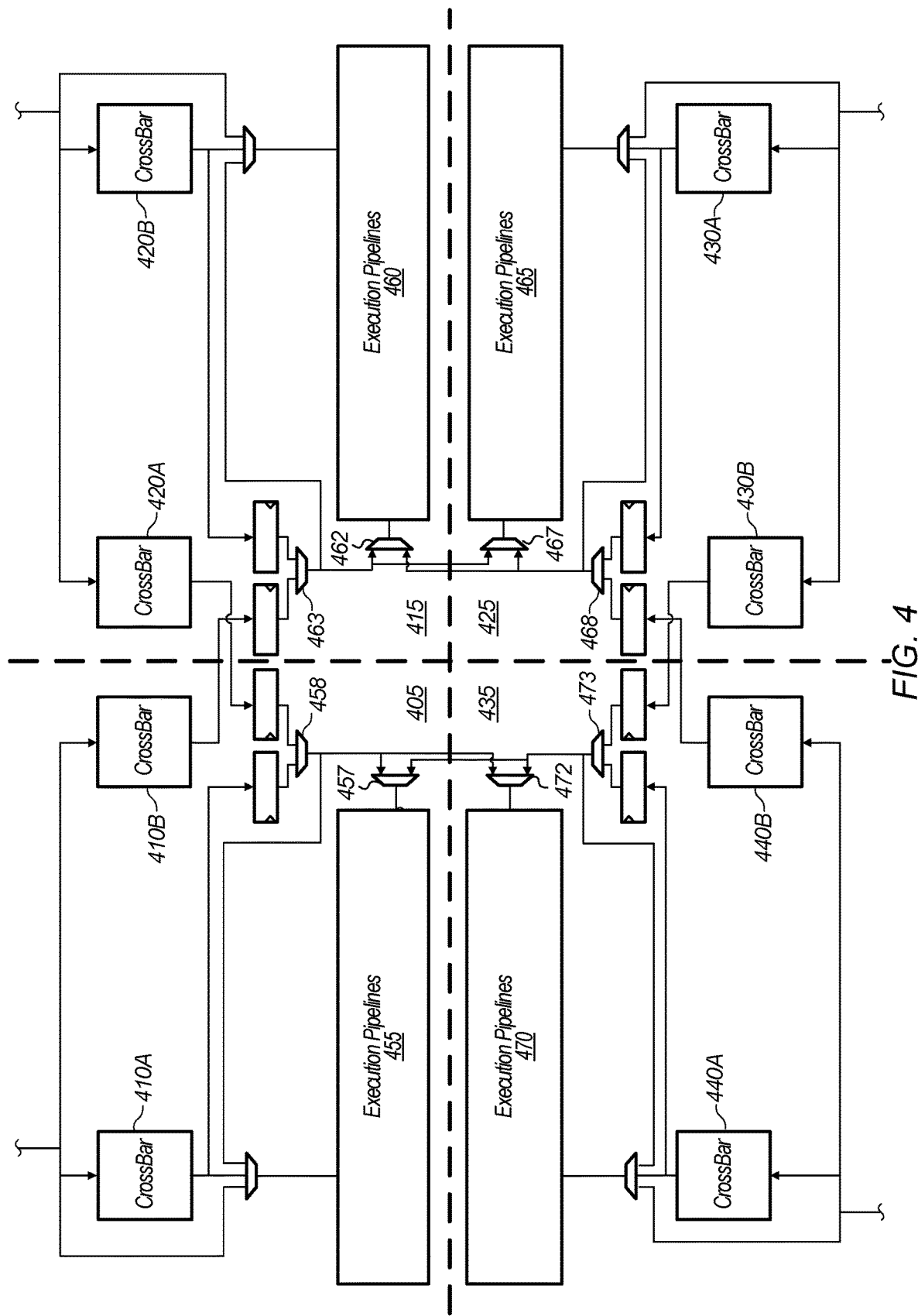
FIG. 4 is a block diagram of one embodiment of a vector processor.

Turning now to FIG. 4, a block diagram of one embodiment of a vector processor is shown. The block diagram of FIG. 4 includes four quadrants, with each quadrant including circuitry similar to that shown for vector processor 300 (of FIG. 3). The vector processor has four quadrants including the top left quadrant 405, the top right quadrant 415, the bottom right quadrant 425, and the bottom left quadrant 435. The output lanes of crossbar 410A of quadrant 405 are coupled to execution pipelines 455 of quadrant 405 and execution pipelines 470 of quadrant 435. The output lanes of crossbar 410B of quadrant 405 are coupled to execution pipelines 460 of quadrant 415 and execution pipelines 465 of quadrant 425.

Similarly, the output lanes of crossbar 420A of quadrant 415 are coupled to execution pipelines 455 of quadrant 405 and execution pipelines 470 of quadrant 435. The output lanes of crossbar 420B of quadrant 415 are coupled to execution pipelines 460 of quadrant 415 and execution pipelines 465 of quadrant 425. The output lanes of crossbar 430A of quadrant 425 are coupled to execution pipelines 465 of quadrant 425 and execution pipelines 460 of quadrant 415. The output lanes of crossbar 430B of quadrant 425 are coupled to execution pipelines 470 of quadrant 435 and execution pipelines 455 of quadrant 405. The output lanes of crossbar 440B of quadrant 435 are coupled to execution pipelines 465 of quadrant 425 and execution pipelines 460 of quadrant 415. The output lanes of crossbar 440A of quadrant 435 are coupled to execution pipelines 470 of quadrant 435 and execution pipelines 455 of quadrant 405.

This coupling of the output lanes of crossbars 410A-B, 420A-B, 430A-B, and 440A-B to the various execution units allows for a permutation to be performed for a larger number of lanes than are included within a single crossbar. For example, in one embodiment, each crossbar 410A-B, 420A-B, 430A-B, and 440A-B is an 8×8 crossbar with 8 input lanes and 8 output lanes. In this embodiment, a 32×32 permutation can be performed using back to back permutation instructions that permutate 16 lanes per instruction. The output of the first permutation instruction is written back to the vector register file (not shown) and then the output of the second permutation instruction is merged with the output of the first permutation instruction to generate the final result of the 32×32 permutation. This allows a 32×32 permutation to be performed using the 8×8 crossbars shown in FIG. 4. In other embodiments, when crossbars 410A-B, 420A-B, 430A-B, and 440A-B have other numbers of input and output lanes, other permutation operations for other numbers of operands can be performed using similar techniques.

Figure 5:
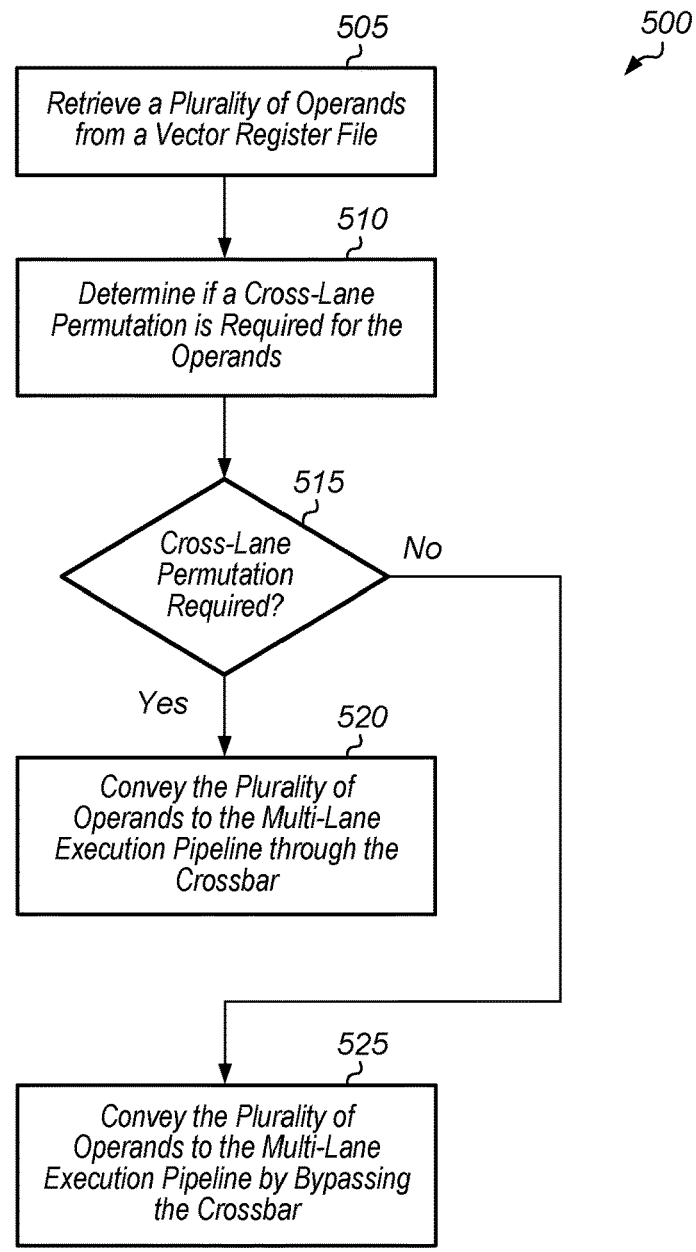
FIG. 5 is a generalized flow diagram illustrating one embodiment of a method for implementing a decoupled crossbar in a vector processor.
Figure 6:
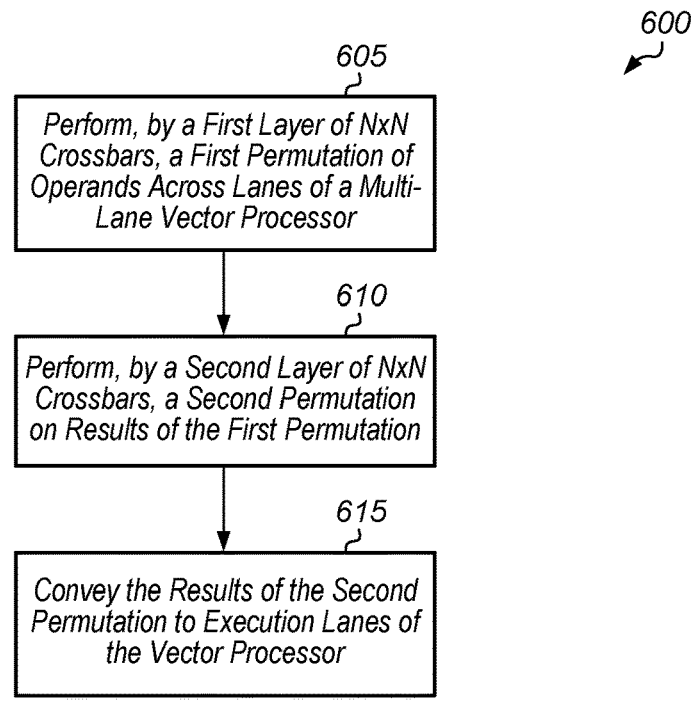
FIG. 6 is a generalized flow diagram illustrating one embodiment of a method for performing permutations with multiple crossbars.
Figure 7:
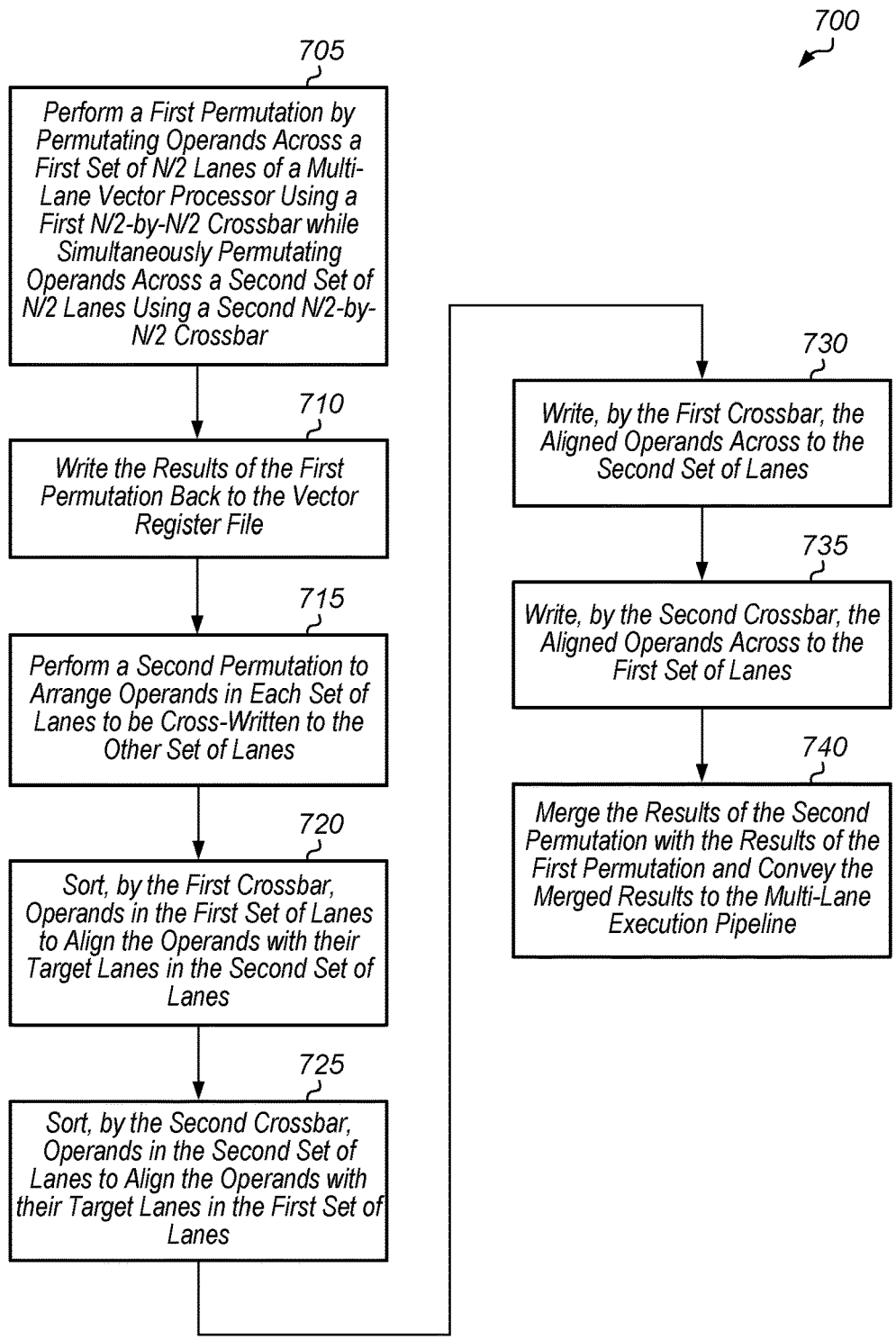
FIG. 7 is a generalized flow diagram illustrating one embodiment of a method for performing an N×N cross-lane operand permutation.

Referring now to FIG. 5, one embodiment of a method 500 for implementing a decoupled crossbar in a vector processor is shown. For purposes of discussion, the steps in this embodiment and those of FIGS. 6-7 are shown in sequential order. However, it is noted that in various embodiments of the described methods, one or more of the elements described are performed concurrently, in a different order than shown, or are omitted entirely. Other additional elements are also performed as desired. Any of the various systems or apparatuses described herein are configured to implement method 500.

A vector processor retrieves a plurality of operands from a vector register file (block 505). It is noted that retrieving the plurality of operands from the vector register file can involve retrieving the operands from an operand buffer and/or vector destination cache which are coupled to the vector register file. For the purposes of this discussion, the operand buffer, vector destination cache, and/or other structures are considered to be part of the vector register file. Next, the vector processor determines if a cross-lane permutation is required for the operands (block 510). In one embodiment, the vector processor determines from the type of instruction operating on the operands if a cross-lane permutation is required.

If a cross-lane permutation is required (conditional block 515, "yes" leg), then the vector processor conveys the plurality of operands to the multi-lane execution pipeline through the crossbar (block 520). If a cross-lane permutation is not required (conditional block 515, "no" leg), then the vector processor conveys the plurality of operands to the multi-lane execution pipeline by bypassing the crossbar (block 525). After blocks 520 and 525, method 500 ends.

Turning now to FIG. 6, one embodiment of a method 600 for performing permutations with multiple crossbars is shown. A first layer of N×N crossbars performs a first permutation of operands across lanes of a multi-lane vector processor (block 605). It is assumed for the purposes of this discussion that N is a positive integer, with the value of N varying from embodiment to embodiment. In one embodiment, N is 8, and the first layer of crossbars includes 8×8 crossbars. In other embodiments, N can be other values. Next, a second layer of N×N crossbars performs a second permutation on results of the first permutation (block 610). Then, the results of the second permutation are conveyed to execution lanes of the vector processor (block 615). After block 615, method 600 ends.

It is noted that in other embodiments, the vector processor can include more than two layers of N×N crossbars. Additionally, in other embodiments, the size of the crossbars can vary in different layers of the crossbar architecture. For example, in one embodiment, a first layer includes 8×8 crossbars, a second layer includes 16×16 crossbars, and so on. Other sizes of crossbars in the different layers are possible and are contemplated.

Referring now to FIG. 7, one embodiment of a method 700 for performing an N×N cross-lane operand permutation is shown. A vector processor performs a first permutation by permutating operands across a first set of N/2 lanes of a multi-lane vector processor using a first N/2-by-N/2 crossbar while simultaneously permutating operands across a second set of N/2 lanes using a second N/2-by-N/2 crossbar (block 705). Next, the results of the first permutation are written back to the vector register file (block 710). It is noted that the results can also be written to the vector destination cache in some embodiments. Then, a second permutation is performed to arrange operands in each set of lanes to be cross-written to the other set of lanes (block 715). Performing the second permutation involves sorting operands in the first set of lanes by the first crossbar to align the operands with their target lanes in the second set of lanes (block 720). Simultaneously with block 720, the second crossbar sorts operands in the second set of lanes to align the operands with their target lanes in the first set of lanes (block 725).

Then, the first crossbar writes the aligned operands from the first set of lanes across to the second set of lanes (block 730). Simultaneously with block 730, the second crossbar writes the aligned operands from the second set of lanes across to the first set of lanes (block 735). Next, the results of the second permutation are merged with the results of the first permutation and the merged results are conveyed to the multi-lane execution pipeline to execute a given instruction (block 740). After block 740, method 700 ends.

Figure 8:
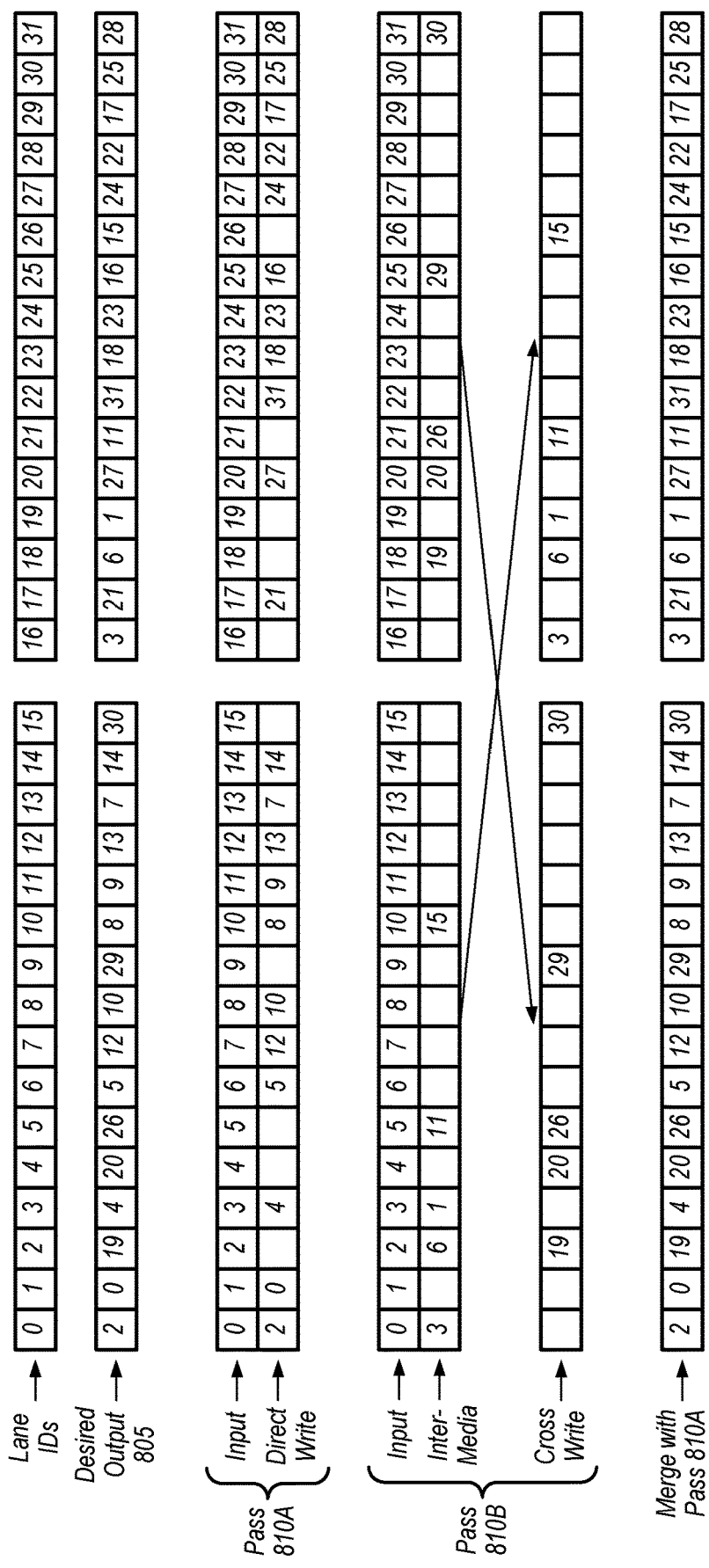
FIG. 8 is a diagram illustrating one embodiment of a technique for performing a multi-step permutation with a crossbar smaller than the lane width of the vector unit.

Turning now to FIG. 8, a diagram of one embodiment of a technique for performing a multi-step permutation with a crossbar smaller than the lane width of the vector unit is shown. The Lane IDs are shown at the top of FIG. 8. In the embodiment shown in FIG. 8, it is assumed that the vector unit includes 32 lanes. It is also assumed that the first 16 lanes (lanes 0-15) have a first crossbar for permutating data across lanes 0-15 and the second 16 lanes (lanes 16-31) have a second crossbar for permutating data across lanes 16-31. In other embodiments, vector units can have other numbers of lanes and/or the vector unit can have other numbers of crossbars, with one crossbar for each group of lanes. The desired output 805 is shown below the lane IDs, with desired output 805 showing how the data should be arranged in the lanes of the vector unit subsequent to the permutation.

A first pass, pass 810A, is implemented to perform separate permutations of the first 16 lanes using the first crossbar and the second 16 lanes using the second crossbar. The direct write to the register file from the first crossbar only includes those operands which are available to lanes 0-15. Similarly, the direct write to the register file from the second crossbar only includes those operands which are available to lanes 16-31.

Next, a second pass, pass 810B, is implemented to permutate the lanes which were not available during first pass 810A. Accordingly, the operands from lanes 0-15 that are being permutated to lanes 16-31 are provided on the original lanes. Then, the data from lanes 0-15 is cross written to the lanes 16-31 during pass 810B. Similarly, the operands from lanes 16-31 that are being permutated to lanes 0-15 are cross written from lanes 16-31 to lanes 0-15 during pass 810B. The multiplexers 457-458, 462-463, 467-468, and 472-473 (of FIG. 4) illustrate one example of a mechanism for cross-writing results between separate sets of threads. Then, the data permutated during pass 810B is merged with the data permutated during pass 810A to produce the arrangement of data which matches desired output 805.

In various embodiments, program instructions of a software application are used to implement the methods and/or mechanisms previously described. The program instructions describe the behavior of hardware in a high-level programming language, such as C. Alternatively, a hardware design language (HDL) is used, such as Verilog. The program instructions are stored on a non-transitory computer readable storage medium. Numerous types of storage media are available. The storage medium is accessible by a computing system during use to provide the program instructions and accompanying data to the computing system for program execution. The computing system includes at least one or more memories and one or more processors configured to execute program instructions.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A system comprising:
a multi-lane execution pipeline having N lanes, where N is a positive, even, integer;
a vector register file comprising N data operands, each operand corresponding to a different lane of the N lanes; and
a first N/2-by-N/2 crossbar comprising N/2 input lanes and N/2 output lanes and a second N/2-by-N/2 crossbar comprising N/2 input lanes and N/2 output lanes;
wherein to perform a permutation operation, the system is configured to:
in a first step, simultaneously:
permutate data operands across a first set of N/2 lanes of the N lanes using the first N/2-by-N/2 crossbar; and
permutate data operands across a second set of N/2 lanes of the N lanes using the second N/2-by-N/2 crossbar;
store results of the first step;
in a second step:
permutate to align data operands in the first set of N/2 lanes with target lanes in the second set of N/2 lanes using the first N/2-by-N/2 crossbar;
permutate to align data operands in the second set of N/2 lanes with target lanes in the first set of N/2 lanes using the second N/2-by-N/2 crossbar;
write aligned data operands from the first set of N/2 lanes across to the second set of N/2 lanes using the first N/2-by-N/2 crossbar;
write aligned data operands from the second set of N/2 lanes across to the first set of N/2 lanes using the second N/2-by-N/2 crossbar; and
merge N lanes of results from the first step with N lanes of cross-written results from the second step.

2. The system as recited in claim 1, wherein the permutation operation comprises the first step and the second step performed in sequence, wherein:
during the first step, the first N/2-by-N/2 crossbar has access to only a first half of the data operands, and the second N/2-by-N/2 crossbar has access to only a second half of the data operands, where the second half of the data operands is different than the first half of the data operands; and during the second step, the first N/2-by-N/2 crossbar has access to only the second half of the data operands, and the second N/2-by-N/2 crossbar has access to only the first half of the data operands.

3. The system as recited in claim 2, wherein:

during the first step, the first N/2-by-N/2 crossbar generates a first output for only a first half of the N lanes and the second N/2-by-N/2 crossbar generates a second output for only a second half of the N lanes, where the second half of the N lanes is different than the first half of the N lanes; and during the second step, the first N/2-by-N/2 crossbar generates a third output for only the second half of the N lanes and the second N/2-by-N/2 crossbar generates a fourth output for only the first half of the N lanes.

4. The system as recited in claim 3, wherein the system is further configured to merge results of the first output, second output, third output, and fourth output.

5. The system as recited in claim 1, wherein during the second step, the system is configured to simultaneously:

sort, using the first N/2-by-N/2 crossbar, first data operands in the first set of N/2 lanes to align the first data operands with target lanes in the second set of N/2 lanes; and sort, using the second N/2-by-N/2 crossbar, second data operands in the second set of N/2 lanes to align the second data operands with target lanes in the first set of N/2 lanes.

6. The system as recited in claim 5, wherein, the system is configured to simultaneously:

write aligned data operands from the first set of N/2 lanes across to the second set of N/2 lanes using the first N/2-by-N/2 crossbar; and write aligned data operands from the second set of N/2 lanes across to the first set of N/2 lanes using the second N/2-by-N/2 crossbar.

7. The system as recited in claim 1, wherein outputs of the first N/2-by-N/2 crossbar and the second N/2-by-N/2 crossbar are coupled to first and second stages of the multi-lane execution pipeline.

8. A method for performing a permutation operation comprising:

in a first step, simultaneously:
permutating data operands across a first set of N/2 lanes of N lanes using a first N/2-by-N/2 crossbar, wherein the first N/2-by-N/2 crossbar comprises N/2 input lanes and N/2 output lanes; and
permutating data operands across a second set of N/2 lanes of the N lanes using a second N/2-by-N/2 crossbar, wherein the second N/2-by-N/2 crossbar comprises N/2 input lanes and N/2 output lanes;

storing results of the first step;

in a second step:
permutating to align data operands in the first set of N/2 lanes with target lanes in the second set of N/2 lanes using the first N/2-by-N/2 crossbar;
permutating to align data operands in the second set of N/2 lanes with target lanes in the first set of N/2 lanes using the second N/2-by-N/2 crossbar;
writing aligned data operands from the first set of N/2 lanes across to the second set of N/2 lanes using the first N/2-by-N/2 crossbar;

writing aligned data operands from the second set of N/2 lanes across to the first set of N/2 lanes using the second N/2-by-N/2 crossbar; and merging N lanes of results from the first step with N lanes of cross-written results from the second step.

9. The method as recited in claim 8, wherein performing the permutation operation comprises performing a first step and a second step in sequence, wherein:

during the first step, the first N/2-by-N/2 crossbar has access to only a first half of the data operands, and the second N/2-by-N/2 crossbar has access to only a second half of the data operands, where the second half of the data operands is different than the first half of the data operands; and during the second step, the first N/2-by-N/2 crossbar has access to only the second half of the data operands, and the second N/2-by-N/2 crossbar has access to only the first half of the data operands.

10. The method as recited in claim 9, further comprising:

during the first step, the first N/2-by-N/2 crossbar generates a first output for only a first half of the N lanes and the second N/2-by-N/2 crossbar generates a second output for only a second half of the N lanes, where the second half of the N lanes is different than the first half of the N lanes; and during the second step, the first N/2-by-N/2 crossbar generates a third output for only the second half of the N lanes and the second N/2-by-N/2 crossbar generates a fourth output for only the first half of the N lanes.

11. The method as recited in claim 10, further comprising:

merging results of the first output, second output, third output, and fourth output.

12. The method as recited in claim 8, wherein during the second step, the method further comprising simultaneously:

sorting, using the first N/2-by-N/2 crossbar, first data operands in the first set of N/2 lanes to align the first data operands with target lanes in the second set of N/2 lanes; and sorting, using the second N/2-by-N/2 crossbar, second data operands in the second set of N/2 lanes to align the second data operands with target lanes in the first set of N/2 lanes.

13. The method as recited in claim 12, step further comprising simultaneously:

writing aligned data operands from the first set of N/2 lanes across to the second set of N/2 lanes using the first N/2-by-N/2 crossbar; and writing aligned data operands from the second set of N/2 lanes across to the first set of N/2 lanes using the second N/2-by-N/2 crossbar.

14. The method as recited in claim 8, further comprising coupling outputs of the first N/2-by-N/2 crossbar and the second N/2-by-N/2 crossbar are coupled to first and second stages of the multi-lane execution pipeline.

15. An apparatus comprising:

a multi-lane execution pipeline having N lanes, where N is a positive, even, integer; and a first N/2-by-N/2 crossbar comprising N/2 input lanes and N/2 output lanes and a second N/2-by-N/2 crossbar comprising N/2 input lanes and N/2 output lanes;

wherein to perform a permutation operation, the apparatus is configured to:

in a first step, simultaneously:
permutate data operands across a first set of N/2 lanes of the N lanes using the first N/2-by-N/2 crossbar; and permutate data operands across a second set of N/2 lanes of the N lanes using the second N/2-by-N/2 crossbar;
store results of the first step;
in a second step:
 permutate to align data operands in the first set of N/2 lanes with target lanes in the second set of N/2 lanes using the first N/2-by-N/2 crossbar; and
 permutate to align data operands in the second set of N/2 lanes with target lanes in the first set of N/2 lanes using the second N/2-by-N/2 crossbar;
 write aligned data operands from the first set of N/2 lanes across to the second set of N/2 lanes using the first N/2-by-N/2 crossbar;
 write aligned data operands from the second set of N/2 lanes across to the first set of N/2 lanes using the second N/2-by-N/2 crossbar; and
merge N lanes of results from the first step with N lanes of cross-written results from the second step.

16. The apparatus as recited in claim 15, wherein the permutation operation comprises the first step and the second step performed in sequence, wherein:
during the first step, the first N/2-by-N/2 crossbar has access to only a first half of the data operands, and the second N/2-by-N/2 crossbar has access to only a second half of the data operands, where the second half of the data operands is different than the first half of the data operands; and
during the second step, the first N/2-by-N/2 crossbar has access to only the second half of the data operands, and the second N/2-by-N/2 crossbar has access to only the first half of the data operands.

17. The apparatus as recited in claim 16, wherein:
during the first step, the first N/2-by-N/2 crossbar generates a first output for only a first half of the N lanes and the second N/2-by-N/2 crossbar generates a second output for only a second half of the N lanes, where the second half of the N lanes is different than the first half of the N lanes; and
during the second step, the first N/2-by-N/2 crossbar generates a third output for only the second half of the N lanes and the second N/2-by-N/2 crossbar generates a fourth output for only the first half of the N lanes.

18. The apparatus as recited in claim 17, wherein the apparatus is further configured to:
merge results of the first output, second output, third output, and fourth output.

19. The apparatus as recited in claim 15, wherein during the second step, the apparatus is configured to simultaneously:
sort, using the first N/2-by-N/2 crossbar, first data operands in the first set of N/2 lanes to align the first data operands with target lanes in the second set of N/2 lanes; and
sort, using the second N/2-by-N/2 crossbar, second data operands in the second set of N/2 lanes to align the second data operands with target lanes in the first set of N/2 lanes.

20. The apparatus as recited in claim 19, wherein during the second step the apparatus is configured to simultaneously:
write aligned data operands from the first set of N/2 lanes across to the second set of N/2 lanes using the first N/2-by-N/2 crossbar; and
write aligned data operands from the second set of N/2 lanes across to the first set of N/2 lanes using the second N/2-by-N/2 crossbar.

* * * * *

UNITED STATES PATENT AND TRADEMARK OFFICE
CERTIFICATE OF CORRECTION

| | |
|---|---|
| PATENT NO. | : 10,970,081 B2 |
| APPLICATION NO. | : 15/637629 |
| DATED | : April 6, 2021 |
| INVENTOR(S) | : Chen et al. |

Page 1 of 1

It is certified that error appears in the above-identified patent and that said Letters Patent is hereby corrected as shown below:

In the Claims

Column 10, Claim 13, Line 44, please delete "step further" and insert -- further --.

Signed and Sealed this
Twenty-first Day of September, 2021

Drew Hirshfeld
*Performing the Functions and Duties of the*
*Under Secretary of Commerce for Intellectual Property and*
*Director of the United States Patent and Trademark Office*